United States Patent
Szeifert et al.

(10) Patent No.: US 11,254,795 B2
(45) Date of Patent: Feb. 22, 2022

(54) PRODUCTION OF MELAMINE-FORMALDEHYDE FOAMS

(71) Applicant: BASF SE, Ludwigshafen am Rhein (DE)

(72) Inventors: Johann Martin Szeifert, Ludwigshafen am Rhein (DE); Bernhard Vath, Ludwigshafen am Rhein (DE); Tobias Heinz Steinke, Ludwigshafen am Rhein (DE); Bettina Wester, Ludwigshafen am Rhein (DE); Cecile Schneider, Ludwigshafen am Rhein (DE); Sebastian Alexander Weisse, Ludwigshafen am Rhein (DE); Peter Wolf, Ludwigshafen am Rhein (DE); Werner Lenz, Ludwigshafen am Rhein (DE); Axel Kirste, Ludwigshafen am Rhein (DE); David John Pung, Cincinnati, OH (US); Megan Roberts, Cincinnati, OH (US)

(73) Assignee: BASF SE, Ludwigshafen am Rhein (DE)

(*) Notice: Subject to any disclaimer, the term of this patent is extended or adjusted under 35 U.S.C. 154(b) by 36 days.

(21) Appl. No.: 16/463,014

(22) PCT Filed: Nov. 14, 2017

(86) PCT No.: PCT/EP2017/079163
§ 371 (c)(1),
(2) Date: May 22, 2019

(87) PCT Pub. No.: WO2018/095760
PCT Pub. Date: May 31, 2018

(65) Prior Publication Data
US 2019/0276623 A1    Sep. 12, 2019

(30) Foreign Application Priority Data
Nov. 23, 2016   (EP) .................................. 16200265

(51) Int. Cl.
*C08J 9/00* (2006.01)
*C08J 9/14* (2006.01)
*C08G 12/32* (2006.01)

(52) U.S. Cl.
CPC ............ *C08J 9/0004* (2013.01); *C08G 12/32* (2013.01); *C08J 9/0061* (2013.01); *C08J 9/0095* (2013.01); *C08J 9/141* (2013.01); C08G 2110/005 (2021.01); C08G 2110/0008 (2021.01); C08J 2201/026 (2013.01); C08J 2203/14 (2013.01); C08J 2205/05 (2013.01); C08J 2205/06 (2013.01); *C08J 2361/28* (2013.01); C08J 2400/12 (2013.01); *C08J 2471/02* (2013.01)

(58) Field of Classification Search
CPC ............ C08G 12/32; C08G 2101/0008; C08G 2101/005; C08G 2110/005; C08G 2110/0008; C08J 9/0004; C08J 9/0061; C08J 9/0095; C08J 9/141; C08J 2201/026; C08J 2203/14; C08J 2205/05; C08J 2205/06; C08J 2361/28; C08J 2400/12; C08J 2471/02; C08J 9/142
See application file for complete search history.

(56) References Cited

U.S. PATENT DOCUMENTS

| | | |
|---|---|---|
| 4,334,971 A | 6/1982 | Mahnke et al. |
| 4,511,678 A | 4/1985 | Mahnke et al. |
| 4,540,717 A | 9/1985 | Mahnke et al. |
| 5,084,488 A | 1/1992 | Weiser et al. |
| 6,608,118 B2 | 8/2003 | Kosaka et al. |
| 2007/0157948 A1* | 7/2007 | Gonzales ................ A47L 13/16 134/6 |
| 2010/0168260 A1 | 7/2010 | Frenzel et al. |
| 2018/0140157 A1 | 5/2018 | Pung et al. |
| 2018/0140158 A1 | 5/2018 | Pung et al. |
| 2018/0202048 A1 | 7/2018 | Kirste et al. |
| 2018/0216233 A1 | 8/2018 | Kirste et al. |
| 2019/0144998 A1 | 5/2019 | Abels et al. |

FOREIGN PATENT DOCUMENTS

| | | |
|---|---|---|
| CA | 1151350 A | 8/1983 |
| EP | 017671 A1 | 10/1980 |
| EP | 017672 A1 | 10/1980 |
| EP | 037470 A1 | 10/1981 |

(Continued)

OTHER PUBLICATIONS

U.S. Appl. No. 16/463,014, filed May 22, 2019, Szeifert et al.

(Continued)

*Primary Examiner* — Irina S Zemel
(74) *Attorney, Agent, or Firm* — Faegre Drinker Biddle & Reath LLP

(57) ABSTRACT

A process for producing a melamine-formaldehyde foam by heating and foaming an aqueous mixture M using microwave radiation, said mixture M comprising at least one melamine-formal-dehyde precondensate, at least one curative, at least one surfactant, at least one blowing agent and at least one linear polymer with a number average molecular weight $M_n$ in the range from 500 to 10,000 g/mol and at least two functional groups selected from OH, $NH_2$ or COOH as well as a melamine-formaldehyde foam obtainable by this process and its use.

10 Claims, No Drawings

(56) References Cited

FOREIGN PATENT DOCUMENTS

| | | |
|---|---|---|
| EP | 074593 A1 | 3/1983 |
| EP | 111860 A2 | 6/1984 |
| EP | 451535 A1 | 10/1991 |
| WO | WO-2007031944 A2 | 3/2007 |

OTHER PUBLICATIONS

European Search Report for Priority Patent Application 16200265.3 dated Mar. 12, 2017.
International Search Report for PCT/EP2017/079163 dated Jan. 3, 2018.
Miller, B., et al., "Liquid Porosimetry: New Methodology and Applications", Journal of Colloid and Interface Science, vol. 162, No. 1, (1994), pp. 163-170.
Written Opinion of the International Searching Authority for PCT/EP2017/079163 dated Jan. 3, 2018.

\* cited by examiner

PRODUCTION OF MELAMINE-FORMALDEHYDE FOAMS

CROSS-REFERENCE TO RELATED APPLICATIONS

This application is a national stage application (under 35 U.S.C. § 371) of PCT/EP2017/079163, filed Nov. 14, 2017, which claims benefit of European Application No. 16200265.3, filed Nov. 23, 2016, both of which are incorporated herein by reference in their entirety.

The subject matter disclosed that was developed and the claimed invention was made by, or on behalf of, to a joint research agreement between BASF SE and The Procter & Gamble Company that was in effect before the effective filing date of the claimed invention.

The present invention relates to a process for producing a melamine-formaldehyde foam by heating and foaming an aqueous mixture M using microwave radiation, said mixture M comprising at least one melamine-formaldehyde precondensate, at least one curative, at least one surfactant, at least one blowing agent and at least one linear polymer with a number average molecular weight $M_n$ in the range from 500 to 10.000 g/mol and at least two functional groups selected from OH, $NH_2$ or COOH as well as a melamine-formaldehyde foam obtainable by this process and its use.

Open-cell resilient foams based on melamine-formaldehyde resins and also processes for producing said foams by heating with hot air, water vapor or microwave irradiation to foam and crosslink a melamine-formaldehyde precondensate dispersion or solution comprising a blowing agent, followed by a drying and annealing step, are known and described in EP-A 074 593, EP-A 017 671, EP-A 017 672, EP-A 037 470 and US 2015/0210814 for example. Melamine-formaldehyde foams of this type generally have good mechanical properties and good acoustical and thermal insulation as well as low flammability.

U.S. Pat. No. 5,084,488 discloses melamine-formaldehyde foams having increased elasticity, in which 0.1 to 70 mol % of the melamine has been replaced by melamine substituted by from 1 to 3 hydroxyoxaalkyl groups.

US 2013/0337255 discloses a melamine formaldehyde foam comprising 0.01 to 45% by weight of a particulate filling material for improved fire characteristics and colorations. A process for production of an abrasive foam base on a melamine-formaldehyde condensate comprising inorganic nanoparticles is disclosed in US 2011/0124754. In both cases, the particulate filling material or nanoparticles are incorporated into the foam by mixing them with the melamine-formaldehyde precondensate, surfactants, curing and blowing agents before heating and foaming the mixture.

US 2010/0168260 A1 discloses open-celled melamine-formaldehyde foams as cleaning implement with a controlled release system of an active agent, which is absorbed, dissolved or chemically linked to a polymer matrix. As polymer matrix water-soluble or water-swellable polymers, such as polyethylene glycols, which are solid at room temperature, may be used.

It is an object of the present invention to provide a process for producing melamine-formaldehyde foams having improved mechanical properties, especially and high ram pressure and improved elastic properties.

We have found that this object is achieved by the process for producing melamine-formaldehyde foams recited at the outset.

The at least one linear polymer preferably has an average number molecular weight $M_n$ in the range from 1000 to 8.000 g/mol and at least two functional groups selected from OH, $NH_2$ or COOH. Most preferably the linear polymer has a number average molecular weight $M_n$ in the range from 3000 to 5.000 g/mol. The number average molecular weight $M_n$ can be calculated from the OH number according to DIN 53240. The functional groups are attached to the polymer backbone, preferably the polymer is bifunctional with two functional groups selected from OH, $NH_2$ or COOH. Most preferably two functional groups are terminal functional groups. Terminal functional groups are functional groups attached at the ends of the polymer chain.

Preferably 0.1 to 5 parts by weight, more preferably 0.3 to 2 parts of the at least one linear polymer is used per 100 parts of melamine-formaldehyde precondensate.

Preferably the linear polymer is hydrophilic. The water solubility of the linear polymer preferably is more than 5% per weight, more preferably more than 10% per weight.

Prefereably the linear polymer comprises at least one terminal hydroxyl group (OH-groups). Most preferably the linear polymer comprises two terminal hydroxyl groups.

The linear polymer consists preferably of the elements carbon, hydrogen and oxygen. Most preferably polyethylene glycol is used as linear polymer.

Preferably the melamine-formaldehyde precondensate having a molar ratio of melamine:formaldehyde ranging from 1:1.5 to 1:4 and an number average molecular weight $M_n$ ranging from 200 g/mol to 1000 g/mol.

Anionic, cationic and nonionic surfactants and also mixtures thereof can be used as dispersant/emulsifier.

Useful anionic surfactants include for example diphenylene oxide sulfonates, alkane and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl and alkylether phosphates. Useful nonionic surfactants include alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters and alkylpolyglycosides. Useful cationic emulsifiers include for example alkyltriammonium salts, alkylbenzyldimethylammonium salts and alkylpyridinium salts.

The dispersants/emulsifiers can be added in amounts from 0.2% to 5% by weight, based on the melamine-formaldehyde precondensate.

Preferably the mixture M comprises a surfactant mixture comprising a mixture of 50 to 90 wt % of at least one anionic surfactant and 10 to 50 wt % of at least one nonionic surfactants, wherein the weight percentages are each based on the total weight of the surfactant mixture.

As curatives it is possible to use acidic compounds which catalyze the further condensation of the melamine resin. The amount of these curatives is generally in the range from 0.01% to 20% by weight and preferably in the range from 0.05% to 5% by weight, all based on the precondensate. Useful acidic compounds include organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides and mixtures thereof.

Preferably formic acid is used as curative.

Depending on the choice of melamine-formaldehyde precondensate, the mixture comprises a blowing agent. The amount of blowing agent in the mixture generally depends on the desired density for the foam. Preferably the amount in relation to the melamine-formaldehyde precondensate is chosen in an amount that the density of the foam is 8 to 12 kg/m³, more preferably 9 to 11 kg/m³.

In principle, the process of the present invention can use both physical and chemical blowing agents. "Physical" or "chemical" blowing agents are suitable (Encyclopedia of Polymer Science and Technology, Vol. I, 3rd ed., Additives, pages 203 to 218, 2003).

Useful "physical" blowing agents include for example hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), alcohols, for example methanol, ethanol, n propanol or isopropanol, ethers, ketones and esters, for example methyl formate, ethyl formate, methyl acetate or ethyl acetate, in liquid form or air, nitrogen or carbon dioxide as gases.

Useful "chemical" blowing agents include for example isocyanates mixed with water, releasing carbon dioxide as active blowing agent. It is further possible to use carbonates and bicarbonates mixed with acids, in which case carbon dioxide is again produced. Also suitable are azo compounds, for example azodicarbonamide.

In a preferred embodiment of the invention, the mixture further comprises at least one blowing agent. This blowing agent is present in the mixture in an amount of 0.5% to 60% by weight, preferably 1% to 40% by weight and more preferably 1.5% to 30% by weight, based on the melamine-formaldehyde precondensate. It is preferable to add a physical blowing agent having a boiling point between 0 and 80° C.

Preferably pentane is used as blowing agent.

The precondensate being foamed up generally by heating the suspension of the melamine-formaldehyde precondensate to obtain a foamed material.

The introduction of energy may preferably be effected via electromagnetic radiation, for example via high-frequency radiation at 5 to 400 kW, preferably 5 to 200 kW and more preferably 9 to 120 kW per kilogram of the mixture used in a frequency range from 0.2 to 100 GHz, preferably 0.5 to 10 GHz. Magnetrons are a useful source of dielectric radiation, and one magnetron can be used or two or more magnetrons at the same time.

The foamed materials produced are finally dried, removing residual water and blowing agent from the foam.

The process described provides blocks/slabs of foamed material, which can be cut to size in any desired shapes.

In a preferred embodiment the process comprises the steps of:
a) producing an aqueous mixture M comprising
  100 parts by weight of at least one melamine-formaldehyde precondensate,
  2 to 4 parts by weight, preferably 2.2 to 3.8 parts by weight and more preferably 2.7 to 3.3 parts of at least one curative,
  0.2 to 5 parts by weight, preferably 0.5 to 3 parts by weight and more preferably 1.25 to 2.3 parts by weight of a surfactant mixture,
  0.1 to 5 parts by weight, preferably 0.5 to 4 parts by weight and more preferably 1.1 to 3.6 parts by weight of at least one salt of an inorganic acid and/or of an organic carboxylic acid,
  1 to 40 parts by weight, preferably 10 to 35 parts by weight and more preferably 15 to 21 parts of at least one blowing agent,
  0.1 to 5 parts by weight, preferably 0.3 to 2 parts off at least one linear, polymer with an average molecular weight (number average) $M_n$ in the range from 500 to 10.000 g/mol, preferably in the range from 3000 to 5.000 g/mol.
  25 to 60 parts by weight, preferably 30 to 50 parts by weight and more preferably 36 to 44 parts of water,
b) heating and foaming said mixture M using microwave radiation,
c) annealing the foam using hot air and/or nitrogen in a temperature range from 150° C. to 290° C., The present invention is further directed to a melamine-formaldehyde foam obtainable by processes according to the invention.

The melamine-formaldehyde foam preferably comprises 0.1 to 5 parts by weight, more preferably 0.3 to 2 parts of the at least one linear polymer per 100 parts of the melamine-formaldehyde foam.

The at least one linear polymer is preferable incorporated into the melamine-formaldehyde resin bridges of the open-cell structure. Incorporated means that the linear polymer is not washed out. Preferably after soaking a foam sample of 250 cm³ in 250 ml deionized water at 25° C. and compressing less than 0.3 mg/ml of the linear polymer more preferably less than 0.1 mg/ml, most preferably 0-0.5 mg/ml of the linear polymer is detected in the water phase.

The foam blocks or slabs can optionally be thermocompressed in a further process step. Thermocompression as such is known to a person skilled in the art and described for example in WO 2007/031944, EP-A 451 535, EP-A 111 860 and U.S. Pat. No. 6,608,118.

The foam obtainable by the process of the present invention preferably has an open-cell structure having an open-cell content, when measured to DIN ISO 4590, of more than 50% and more particularly more than 95%. Preferably the density of the foam is 8 to 12 kg/m³, more preferably 9 to 11 kg/m³.

FIG. 1 is a graphical representation of compression deflection force versus d90/d10 ratio of the melamine-formaldehyde foam of the present invention (Sample 4) and various commercially available foams (Samples 1, 2, 3, 5 and 6). Specifically, the melamine-formaldehyde foam of the present invention preferably have a d90/d10 ratio above 1.65, more probably above 1.7 and most preferably above 1.8 and preferably have a compression deflection pressure above 22.4 (3.25 psi), more probably above 25.9 kPa (3.75 psi) and most preferably above 29.3 kPa (4.25 psi).

The melamine-formaldehyde foam according to the present invention can be used for acoustical and/or thermal insulation in aircraft, ship and motor vehicle construction, in mechanical engineering or in building construction.

The melamine-formaldehyde foams obtainable by the processes of the present invention are superior to the previously known melamine-formaldehyde foams especially in having an improved combination of elastic recovery after compression and high ram pressure.

EXAMPLES

Methods of Measurement:
Ram Pressure Value [N]:
All the ram pressure value measurements for assessing the mechanical/resilient properties of the melamine-formaldehyde foams were carried out as follows: A cylindrical steel ram 8 mm in diameter 10 cm in height was pressed at a right angle into a cylindrical foam sample 11 cm in diameter and 5 cm in height until the foam sample broke. The maximum force (unit: N) exerted by the ram until the foam sample broke is hereinafter also referred to as ram pressure value and provides information about the mechanical/resilient quality of the foam. The greater the ram pressure values are, the better the mechanical/resilient properties of the melamine-formaldehyde foams are; the further the values measured on any one melamine-formaldehyde foam parallel and perpendicularly to the direction of rise of the foam differ from each other, the greater the anisotropy is and the worse the homogeneity is of the foam.

Compression Set [%]:

All the compression set value measurements for assessing the elastic properties of wet melamine formaldehyde foams were carried out as follows:

A rectangular foam sample (cut into dimensions: 40 mm×40 mm, height: 25 mm) is soaked in deionized water, and compressed for 60 min between two steel plates (1 cm thickness) to either 20% (5 mm) or 8% (2 mm) of its initial height.

The compression set is determined by the following formula: $C=(h0-h1)/h0$, where h0 is the initial height before compression and hi is the sample thickness after compression. C0.5 denotes the compression set after 30 min and C24 after 24 hours, respectively.

Compression Deflection Pressure Test Method:

The average Compression Deflection Pressure is determined using the standard method ASTM D3575-14, (approved Jan. 1, 2014), according to the procedures specified in Sections 1-8 and Suffix D (Sections 17-24) with the following modifications: application of the method is extended to additional polymer types including but not limited to melamine formaldehyde; the extent of compression (Sections 17, 22, and 23) is set at 70%; the sample is wetted prior to measurement by placing in a tub of deionized water until eraser is fully submersed then immediately measured without compressing prior to measurement; and the value of the compression deflection force per unit area of specimen in equation 2 of Section 22 and in Section 23 is reported in units of psi. Both the average thickness after pretest pressure and the average compression deflection force as specified in Section 23 are record.

Cumulative Pore Volume Test Method:

The Cumulative Pore Volume Test Method is used to determine the Cumulative Pore Volume D90/D10 Ratio. This method makes use of stepped, controlled differential pressure and measurement of associated fluid movement to characterize the distribution of effective pore radii that exist in a material specimen within the range of 10 to 800 μm.

Method Principle

For uniform cylindrical pores, the radius of a pore is related to the differential pressure required to fill or empty the pore by the equation Differential pressure=$(2\gamma \cos \theta)/r$, where $\gamma$=liquid surface tension, $\theta$=contact angle, and r=pore radius.

Pores contained in natural and manufactured porous materials are often thought of in terms such as voids, holes or conduits, and these pores are generally not perfectly cylindrical nor all uniform. One can nonetheless use the above equation to relate differential pressure to an effective pore radius, and by monitoring liquid movement into or out of the material as a function of differential pressure characterize the effective pore radius distribution in a porous material. (Because nonuniform pores are approximated as uniform by through the use of an effective pore radius, this general methodology may not produce results precisely in agreement with measurements of void dimensions obtained by other methods such as microscopy.)

The Cumulative Pore Volume Method uses the above principle and is reduced to practice using the apparatus and approach described in "Liquid Porosimetry: New Methodology and Applications" by B. Miller and I. Tyomkin published in The Journal of Colloid and Interface Science (1994), volume 162, pages 163-170. This method relies on measuring the increment of wetting (low-contact-angle) liquid volume that enters or leaves a porous material as the differential air pressure is changed between ambient ("lab") air pressure and a slightly elevated air pressure (positive differential pressure) surrounding the specimen in a sample test chamber. The specimen is introduced to the sample chamber dry, and the sample chamber is controlled at a positive differential pressure (relative to the lab) to prevent fluid uptake into the specimen after the fluid bridge is opened. After opening the fluid bridge, the differential air pressure is decreased in steps (but remains positive), subpopulations of pores acquire liquid according to their effective pore radius. After reaching a minimal (though positive) differential pressure (corresponding to the largest effective pore radius of interest in the specimen) at which the specimen fluid within the fluid is at a maximum, differential pressure is increased stepwise again toward the starting pressure, and the liquid is drained from the specimen. It is during this latter draining sequence (from lowest differential pressure, or largest corresponding effective pore radius, to the largest differential pressure, or smallest corresponding effective pore radius), that cumulative volume distribution is determined in this method. Normalizing to the maximum volume of fluid acquired by the sample (at lowest differential pressure), the cumulative pore volume distribution (as a function of differential pressure, and therefore effective pore radius) is determined by recursively subtracting the incremental volume of liquid drained from the specimen upon each increase in differential pressure step, and this incremental volume is associated with the setpoint of differential pressure (and therefore its effective pore radius) for each particular step.

Sample Conditioning and Specimen Preparation

The Cumulative Pore Volume Method is conducted on samples that have been conditioned in a conditioned room at a temperature of 23° C.±2.0° C. and a relative humidity of 45%±10% for a minimum of 12 hours prior to the test. Except where noted all tests are conducted in such conditioned room, all tests are conducted under the same environmental conditions and in such conditioned room. Any damaged product or samples that have defects such as wrinkles, tears, holes, and similar are not tested. Samples conditioned as described herein are considered dry samples for purposes of this invention. Three specimens are measured for any given material being tested, and the results from those three replicates are averaged to give the final reported value. Each of the three replicate specimens has dimensions of 15 mm×55 mm×55 mm, and the broad surfaces are made parallel and microscopically flat. If no sample available is large enough to create specimens of this size, a smaller specimen may be used with using an acrylic plate (below) sized to maintain the same applied pressure.

One of skill understands that involve several preparation steps, which may include the removal of all cleaning liquid and the separation of the various ply sheets from each other and from other components of the finished article. Furthermore, one of skill understands it is important to ensure the preparation does not damage the ply being tested or alter the measured pore volume characteristics.

Apparatus

Apparatus suitable for this method is described in: "Liquid Porosimetry: New Methodology and Applications" by B. Miller and I. Tyomkin published in The Journal of Colloid and Interface Science (1994), volume 162, pages 163-170. Further, any pressure control scheme capable of controlling the sample chamber pressure between 5 mm H2O and 1000 mm H2O differential pressure may be used in place of the pressure-control subsystem described in this reference. One example of suitable overall instrumentation and software is the TRI/Autoporosimeter (Textile Research Institute (TRI)/ Princeton Inc. of Princeton, N.J., U.S.A.). The TRI/Autoporosimeter is an automated computer-controlled instrument for measuring pore volume distributions in porous materials (e.g., the volumes of different size pores within the range from 1 to 1000 μm effective pore radii). Computer programs such as Automated Instrument Software Releases 2000.1 or 2003.1/2005.1; or Data Treatment Software Release 2000.1 (available from TRI Princeton Inc.), and spreadsheet programs may be used to capture and analyse the measured data.

Method Procedure

The wetting liquid used is a 0.1% by weight solution of octylphenoxy polyethoxy ethanol (Triton X-100, a non-ionic surfactant available from The Dow Chemical Co., Midland, Mich.) in distilled water. Liquid density is 1.00 g/cm3, surface tension γ to be 30 mN/m, and the contact angle θ to be 0° such that cos θ=1. A 90-mm diameter mixed-cellulose-ester filter membrane with a characteristic pore size of 0.22 μm (such Millipore Corporation of Bedford, Mass., Catalog # GSWP09000) is affixed to the porous frit (monel or 316 stainless steel, media grade 80 from Mott Corp., Farmington, Conn., or equivalent) of the sample chamber.

A 4 cm×4 cm acrylic plate weighing 32 g is placed on the sample to ensure the sample rests flat on the filter membrane during measurement. No additional weight is placed on the sample. The sequence of differential pressures that are run in the test, in mm $H_2O$ is as follows: 612.6, 306.3, 204.2, 153.2, 122.5, 102.1, 87.5, 76.6, 68.1, 61.3, 51.0, 43.8, 38.3, 34, 30.6, 27.8, 25.5, 23.6, 21.9, 20.4, 17.5, 15.3, 13.6, 12.3, 11.1, 10.2, 9.4, 8.8, 8.2, 7.7, 8.2, 8.8, 9.4, 10.2, 11.1, 12.3, 13.6, 15.3, 17.5, 20.4, 21.9, 23.6, 25.5, 27.8, 30.6, 34, 38.3, 43.8, 51.0, 61.3, 68.1, 76.6, 87.5, 102.1, 122.5, 153.2, 204.2, 306.3, and 612.6. The criterion for moving from one pressure step to the next is that fluid uptake/drainage from the specimen is measured to be less than 15 μL/min.

Determination of Cumulative Pore Volume D90/D10 Ratio from Cumulative Pore Volume Distributions The cumulative pore volume distributions (that is, normalized cumulative pore volume as a function of effective pore radius) for the three specimens measured are averaged. D90 is defined as the effective pore radius at which the cumulative pore volume distribution function has a value of 0.90. If no measured data point satisfies this, D90 is determined by a linear interpolation between the two data points immediately proximal. Similarly, D10 is defined as the effective pore radius at which the cumulative pore volume distribution function has a value of 0.10. If no measured data point satisfies this, D10 is determined by a linear interpolation between the two data points immediately proximal. The quotient of D90 and D10 is the Cumulative Pore Volume D90/D10 Ratio.

Materials Used:

| | |
|---|---|
| MF | Melamine-formaldehyde precondensate having an average molecular weight (number average) M of 350 g/mol, with a molar ratio of melamine:formaldehyde of 1:3. |
| aS | C12/C14-alkyl sulfate, sodium salt. |
| nS | alkyl polyethylene glycol ether made from a linear, saturated C16/C18 fatty alcohol. |
| E1000 | Pluriol ® E1000 (Polyethylene glycol with a number average molecular weight of 1000) |
| E4000 | Pluriol ® E4000 (Polyethylene glycol with a number average molecular weight of 4000) |
| E6000 | Pluriol ® E6000 (Polyethylene glycol with a number average molecular weight of 6000) |
| E8000 | Pluriol ® E8000 (Polyethylene glycol with a number average molecular weight of 8000) |
| eG | ethoxylated glycerol with an average molecular weight of 310 g/mol |
| eTMP | ethoxylated trimethylolpropane with a number average molecular weight of 670 g/mol |

Example 1

In a first step, 100 parts by weight of the melamine-formaldehyde precondensate, MF, 38 parts of water, 1.2 parts of anionic surfactant aS, 0.3 parts of non-ionic surfactant nS, 2.5 parts of sodium formate, 3.0 parts of formic acid, 0.5 parts of polyethylene glycol Pluriol® E4000 and 18 parts of the pentane were mixed with one another at a temperature of 20 to 35° C. The mixture was introduced into a foaming mold of polypropylene and irradiated in a microwave oven with microwave. The foam bodies obtained after microwave irradiation were annealed in a circulating air oven at 200° C. for 20 min.

Example 2

Example 1 was repeated with the difference that 1.0 parts Pluriol® E 4000 were used.

Examples 3 to 5

Example 1 was repeated with the difference that 0.5 parts Pluriol® E 6000, E8000 and E1000 were used.

Example 6

Example 1 was repeated with the difference that 20 parts pentane were used.

Example 7

Example 1 was repeated with the difference that 0.5 parts ethoxylated glycerol were used.

Example 8

Example 1 was repeated with the difference that 0.5 parts ethoxylated trimethylolpropane were used.

Comparative Examples C1 and C2

Example 1 was repeated with the difference that no polyethylenglycol was added and 18 parts (C1) and 16 parts (C2) pentane were added.

Density and mechanical data (ram pressure, compression sets C0.5 and C24, compression strength) of the foams are summarized in Table 1. All data are the average of 3 measurements.

Comparative Example C3

An aqueous solution of Pluriol E4000 was prepared by dissolving the PEG in deionized water under magnetic stirring to yield a concentration of 1% wt.

A Melamine-formaldehyd foam samples cut to dimensions of 122×67×30 mm$^3$ was soaked with the solution in an aluminum tray and pressed out by hand three times to remove excess water. Afterwards the sample was dried for 6 h in an oven at 70° C. to reach constant weight.

The sample was rinsed by putting it in an aluminum tray filled with 250 ml of deionized water at room temperature where it was allowed to soak and was afterwards pressed out by hand three times. Afterwards the foam was flipped over and the procedure is repeated.

The washing water was analyzed for its concentration of PEG.

TABLE 1

Type and amount of polymeric additive added per 100 parts of melamine-formaldehyde precondensate and physical and mechanical properties of the foams of Examples 1 to 8 and comparative Examples C1 to C2

| Example | C1 | C2 | 1 | 2 | 3 | 4 | 5 | 6 | 7 | 8 |
|---|---|---|---|---|---|---|---|---|---|---|
| Type of additive | — | — | E4000 | E4000 | E6000 | E8000 | E1000 | E4000 | eG | eTMP |
| parts of additive added | — | — | 0.5 | 1 | 0.5 | 0.5 | 0.5 | 0.5 | 0.5 | 0.5 |
| Density, g/L | 9 | 11 | 9 | 8 | 9 | 8 | 9 | 11 | 8 | 8 |
| Ram pressure value, N | 34 | 20 | 44 | 39 | 39 | 34 | 36 | 32 | 49 | 41 |
| Compression set C0.5, % | 75 | 82 | 58 | 73 | 70 | 73 | 73 | 68 | 78 | 80 |
| Compression set C24, % | 35 | 41 | 17 | 32 | 31 | 33 | 35 | 30 | 40 | 40 |

TABLE 2

Concentration of PEG found in the washing water after soaking in water

| | Example | |
|---|---|---|
| | 1 | C3 |
| Sample | Foamed with 0.5 parts Pluriol ® 4000 | Impregnated with 1% aqueous solution of Pluriol ® 4000 |
| mg/ml Pluriol ® | 0 | 0.5 |

Sample 4 prepared according to Example 1 provide increased robustness as compared to various commercially available and other implements (Samples 1, 2, 3, 5 and 6).

The invention claimed is:

1. A process for producing a melamine-formaldehyde foam by heating and foaming an aqueous mixture M using microwave radiation, said mixture M comprising at least one melamine-formaldehyde precondensate, at least one curative, at least one surfactant, at least one blowing agent and at least one linear, polymer with a number average molecular weight $M_n$ in the range from 500 to 10,000 g/mol and at least two functional groups selected from OH, NH$_2$ or COOH and wherein polyethylene glycol is used as linear polymer.

2. The process according to claim 1, wherein the linear polymer has a number average molecular weight $M_n$ in the range from 3000 to 5,000 g/mol.

3. The process according to claim 1, wherein the linear polymer has a water solubility at 23° C. of more than 5% per weight.

4. The process according to claim 1, wherein the linear polymer comprises at least two terminal hydroxyl groups.

5. The process according to claim 1, wherein the linear polymer consists of the elements carbon, hydrogen and oxygen.

6. The process according to claim 1, wherein the melamine-formaldehyde precondensate having a molar ratio of melamine-formaldehyde ranging from 1:1.5 to 1:4 and an number average molecular weight $M_n$ ranging from 200 g/mol to 1000 g/mol is used.

7. The process according to claim 1, wherein said mixture M comprises a surfactant mixture comprising a mixture of 50 to 90 wt% of at least one anionic surfactant and 10 to 50 wt% of at least one nonionic surfactant, wherein the weight percentages are each based on the total weight of the surfactant mixture.

8. The process according to claim 1, wherein formic acid is used as curative.

9. The process according to claim 1, wherein pentane is used as blowing agent.

10. The process according to claim 1, comprising the steps of:
a) producing an aqueous mixture M comprising 100 parts by weight of at least one melamine-formaldehyde precondensate, 2 to 4 parts by weight of at least one curative, 0.2 to 5 parts by weight of a surfactant mixture, 0.1 to 5 parts by weight of at least one salt of an inorganic acid and/or of an organic carboxylic acid, 1 to 40 parts by weight of at least one blowing agent, 0.1 to 5 parts by weight off at least one linear, polymer with a number average molecular weight $M_n$ in the range from 500 to 10,000 g/mol 0 to 20 parts by weight of one or more further additives, and 25 to 60 parts by weight of water, b) heating and foaming said mixture M using microwave radiation, c) annealing the foam using hot air and/or nitrogen in a temperature range from 150° C. to 290° C.

* * * * *